United States Patent [19]

Jandeska, Jr. et al.

[11] 4,325,757
[45] Apr. 20, 1982

[54] METHOD OF FORMING THIN CURVED RARE EARTH-TRANSITION METAL MAGNETS FROM LIGHTLY COMPACTED POWDER PREFORMS

[75] Inventors: William F. Jandeska, Jr., Rochester; Charles F. Netherton, Marine City, both of Mich.

[73] Assignee: General Motors Corporation, Detroit, Mich.

[21] Appl. No.: 72,081

[22] Filed: Sep. 4, 1979

[51] Int. Cl.³ .............................................. H01F 1/02
[52] U.S. Cl. ..................................... 148/103; 29/596; 29/420.5; 29/608; 75/208 R; 75/214; 228/173 A
[58] Field of Search ......................... 148/103, 105, 101; 75/208 R, 214; 29/596, 597, 608, 420.5, 421 M; 228/173 A, 186, 265; 264/57, 58, 60, 61; 310/42, 44, 154, 254

[56] References Cited

U.S. PATENT DOCUMENTS

| | | | |
|---|---|---|---|
| 4,081,297 | 3/1978 | Nagel et al. | 148/103 |
| 4,087,291 | 5/1978 | Gaiffi et al. | 148/103 |
| 4,104,787 | 8/1978 | Jandeska et al. | 148/103 |
| 4,123,297 | 10/1978 | Jandeska et al. | 148/103 |
| 4,144,060 | 3/1979 | Jandeska et al. | 148/105 |
| 4,151,435 | 4/1979 | Jandeska et al. | 310/42 |

Primary Examiner—L. Dewayne Rutledge
Assistant Examiner—John P. Sheehan
Attorney, Agent, or Firm—Elizabeth F. Harasek

[57] ABSTRACT

A method is provided for forming rare earth-transition metal (RE-TM) powders directly into radially aligned, thin, curved permanent magnets supported on ferromagnetic backings. Such magnets are particularly suited for use as D.C. motor pole pieces. In the method, a powder cavity is formed between a ferromagnetic backing layer and a composite forming mandrel. The mandrel has a ferromagnetic core slidably retained in a thin magnetic sleeve. The powder in the cavity is pressed in a magnetic field to a density of about 50%. Thereafter, the core of the mandrel is first removed and then the nonmagnetic sleeve. After both mandrel sections are withdrawn, the powders are maintained in the magnet shape for further processing by mechanical interlocking of the particles, and the magnet shape itself is magnetically attracted to the backing layer by the residual magnetism of the powder. The mass may be heated to coalesce the powder and bond it to the backing.

3 Claims, 8 Drawing Figures

METHOD OF FORMING THIN CURVED RARE EARTH-TRANSITION METAL MAGNETS FROM LIGHTLY COMPACTED POWDER PREFORMS

This invention relates to a method of forming rare earth-transition metal powders directly into thin, curved, permanent magnets metallurgically bonded to a ferromagnetic backing sheet. More particularly, the invention relates to a method of pressing and magnetically aligning rare earth-transition metal powders against a ferromagnetic motor casing member at relatively low compaction pressures, with the assistance of a specially adapted composite pressing mandrel. The lightly compacted powders are maintained in the desired magnet configurations for further processing by mechanical interlocking of the particles and residual magnetic attraction between the powder body and the backing.

BACKGROUND OF THE INVENTION

Rare earth-transition metal (RE-TM) magnets have excellent magnetic properties. They are approximately ten times stronger than iron magnets, and five times stronger than ferrite magnets. Their residual magnetic strengths make them particularly suitable for use as pole pieces in small size, high torque, DC motors. RE-TM magnets having long, thin, curved shapes are particularly useful as DC motor pole pieces when they are metallurgically bonded to the inside walls of the motor casing. When the motor casing is made of a ferromagnetic material, such as steel, it not only provides support for the magnets and other motor components, but also serves as a return flux path for the magnets.

By rare earth-transition metal compound is meant, the chemical combination of a transition metal such as cobalt, nickel, iron, manganese and chrome, and a rare earth element such as yttrium, lanthanum, cerium, praseodymium, neodymium, promethium, europium, gadolinium, terbium, dysprosium, holmium, erbium, thulium, ytterbium, or samarium. The rare earth constituent may also be in the form of mischmetal, naturally occurring or refined combinations of rare earth elements. A preferred magnet composition is, e.g., $SmCo_5$. The rare earth-transition metals suitable for use herein are those having high energy products. The energy product is a measure of the energy that a magnet material can supply to an external magnetic circuit such as a flux field for a D.C. motor, without demagnetizing.

The physical characteristics of RE-TM powders make them difficult to form into densified curved shapes by standard powder metallurgy methods. The powder particles are extremely hard (approximately Rockwell C-53 for $SmCo_5$), and have low compressibility. Efficient use of RE-TM materials requires good magnetic alignment. In our earlier work, we discovered a method for pressing RE-TM powders into relatively high density, self-supporting, thin, curved compacts wherein the individual particles were radially magnetically aligned. The compaction required two specially adapted powder metal presses, the first to magnetically align the powder and the second to achieve the high pack density necessary for self-supporting compacts. Moreover, hardened die liners were required to cut down die wear and to transport the powders between presses. The method of making these dense RE-TM powder compacts is described in U.S. Pat. No. 4,123,247. We also discovered a method of using hot isostatic compaction to densify thin, curved RE-TM powder compacts into magnetic pole pieces for cylindrically shaped DC motors. That invention is described in U.S. Pat. No. 4,104,787. A method of densifying curved green powder compacts into permanent magnets by hot isostatic pressing is disclosed in U.S. Pat. No. 4,151,060, and by restrained sintering in U.S. Pat. No. 4,144,060.

Before this invention, it was not known how to form relatively long, thin, curved, rare earth-transition metal magnets, with radially aligned magnetic domains, without first forming self-supporting green powder compacts. Furthermore, the thinness of RE-TM magnets was practically limited by the green strengths of the pressed powder compacts. We have discovered a method of making long, curved, RE-TM magnets as thin as desired.

OBJECTS OF THE INVENTION

It is therefore an object of this invention to provide a method of forming rare earth-transition metal powders directly into thin, curved permanent magnets, metallurgically bonded to metal backings, without first forming self-supporting green compacts. It is a more specific object to form the RE-TM magnets adjacent the inner walls of DC electric motor casings such that they may serve as pole pieces therefor.

It is a further object to provide a method of forming such magnets wherein the RE-TM powder can be pressed, radially magnetically aligned, and stabilized in the aligned state in a single operation at relatively low compaction pressures.

It is another object to provide a method of making relatively long, curved magnets as thin as desired.

It is a more specific object to provide a means of pressing loose earth-transition metal powders in the presence of an induced magnetic field such that after the field is removed, residual magnetism in the particles causes them to be attracted to and supported by a ferromagnetic metal backing member in a cohesive mass having the shape of the desired magnet. The backing member may be a tubular casing for a DC motor. The lightly pressed and aligned powders may be readily processed in the casing to form densified, permanent, rare earth-transition metal motor pole magnets.

It is another object of the method to provide a pressing fixture with arcuate shaped die cavities for compacting loose RE-TM powder, the press being equipped with suitable magnetizing means and a specially adapted composite compacting mandrel. It is a more specific object to provide a composite mandrel having a magnetizable solid cylindrical core slidably retained in a thin nonmagnetic sleeve. It is another object of the method to apply a magnetic field with flux lines that radially intersect the die cavities and permeate the mandrel core at the same time powder in the cavities is pressed to a suitable density. It is yet another object to provide means such that after the powder is pressed and the magnetic field removed, the mandrel core is axially withdrawn from the die cavities followed by the removal of the nonmagnetic sleeve such that the pressed powder is left undisturbed in the magnet configuration. A further object is to provide a method such that after both portions of the composite mandrel are withdrawn, the magnetized powder remains as a cohesive mass in the magnet shape that is primarily magnetically attracted to the ferromagnetic backing member.

BRIEF SUMMARY OF THE INVENTION

In accordance with a preferred embodiment of our invention, these and other objects and advantages are obtained as follows. Finely ground RE-TM powder, wherein substantially all the individual powder particles have single magnetic domains, is introduced into thin, arcuate powder cavities having the shape of the desired magnet. The outside periphery of the cavities is defined by a tubular plain steel sheet, suitable for a motor casing for a small DC motor. The sheet is retained adjacent the die walls of a press. The inner periphery of the powder cavities is formed by opposing axial slots in the outer wall of a generally cylindrical composite pressing mandrel. The bottom of the cavities is defined by the top edge of a stationary annular punch in which the mandrel is slidably retained. The composite pressing mandrel consists of a solid ferromagnetic core slidably retained in close fitting relation to a relatively thin, and wear-resistant nonmagnetic sleeve. The press is equipped with a movable cylindrical punch that slides in the die walls to compact the powder, and magnetizing means to induce a magnetic field in the die cavities.

A magnetizing field of sufficient strength to mechanically rotate the RE-TM particles along the field lines is applied to the powder in the die cavities. The field lines are oriented radially with respect to the cavity curvature. The solid magnetic core of the pressing mandrel assures that it will not interrupt the field lines, the nonmagnetic sleeve portion thereof being thin enough to have little effect on the field. At the same time the field is applied, the cylindrical punch is stroked, pressing the powder in the die cavities in an axial direction with respect to the die cavity curvature. Pressing is continued to a pack density of about 50% of the density of the RE-TM material whereat the powder particles become mechanically interlocked and are inhibited from movement when the magnetic field is removed. The magnetic field is removed, and the magnetic core of the pressing mandrel is withdrawn in the axial direction. Thereafter, the nonmagnetic casing portion is carefully removed. Once the magnetic core of the mandrel is moved away from the die cavity, the residual magnetism induced by the aligning field causes the lightly compacted powder body to be primarily magnetically attracted to the ferromagnetic backing member. The particles, being mechanically interlocked, are not disturbed by removal of the nonmagnetic sleeve. The tubular backing member is ejected from the press with the attached powder magnet preforms retained on its inner walls. A preferred method of densifying the powder performs into strong RE-TM magnets is by hot isostatic pressing as described in U.S. Pat. No. 4,151,435.

DETAILED DESCRIPTION OF THE INVENTION

A better understanding of our invention will be had from the following Figures, and detailed description of the invention. Reference will be made to the drawings in which.

We have discovered a method of making densified, radially aligned, permanent RE-TM magnets with relatively long, thin, curved shapes without first having to form a coherent green powder metal compact. Our method provides a means of making magnets only a few microns thick, if desired, and much thinner than has heretofore been possible. The invention features the use of a specially adapted composite pressing mandrel in a dual function compacting and magnetizing fixture.

Figure 1:
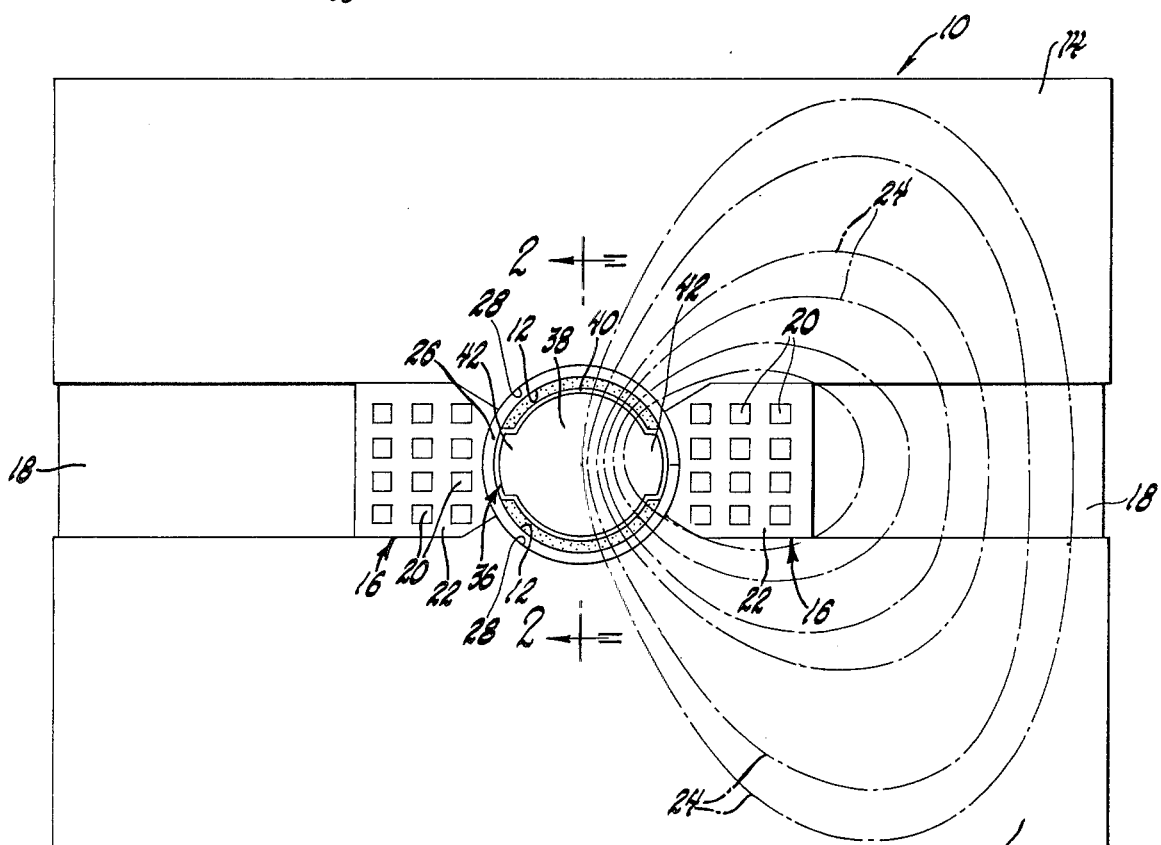
FIG. 1 is a plan view of a compacting and magnetizing apparatus showing a tubular backing member, composite pressing mandrel, and powder filled cavities in the dies. Imaginary magnetic field lines are shown by the dashed lines.

In a preferred embodiment, RE-TM powder magnet preforms are made as follows. Referring to FIG. 1, a fixture 10 is provided for simultaneously compacting and radially magnetically aligning RE-TM powder retained in two opposing arcuate shaped powder cavities 12. The fixture has magnetically soft iron die blocks 14, and two opposing magnetizing units 16 held in place in die blocks 14 by means of soft iron spacers 18. The magnetizing units are made up of shielded copper coils 20 retained in an iron matrix 22. When a current is caused to flow through coils 20, a magnetic field is created that is generally represented by the hashed field lines 24. The powder cavities 12 are positioned in press 10 so that flux lines 24 pass through the cavities along radii of their curvature.

Figure 2:
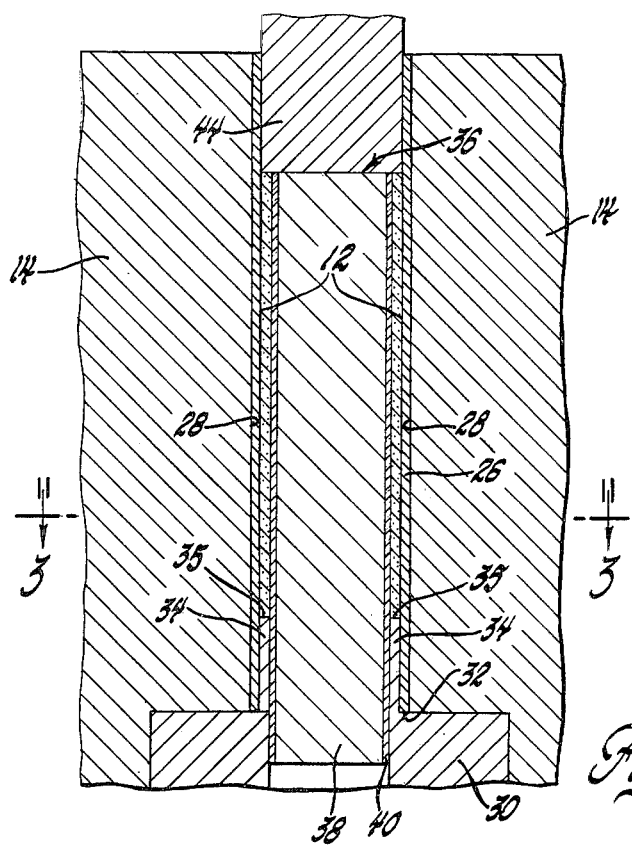
FIG. 2 is a cross-sectional view of a portion of FIG. 1 taken along line 2—2. The figure additionally shows a stationary lower annular punch and a movable upper punch.
Figure 3:
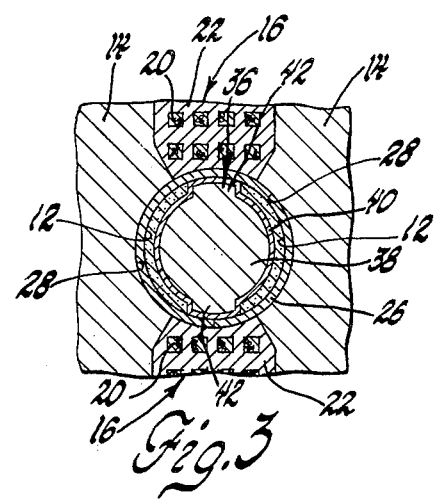
FIG. 3 is a sectional view of FIG. 2 taken along line 3—3.

With reference to FIGS. 2 and 3, preparatory to pressing and magnetizing RE-TM powder in fixture 10 of FIG. 1, a rolled, plain steel cylindrical sheath 26 is positioned in fixture 10 to fit closely against die walls 28. An annular stationary punch 30 is inserted in fixture 10 as shown at FIG. 2 such that the bottom 32 of sheath 26 rests on its shoulders.

The horizontal ledges 35 of upper flange portions 34 of stationary punch 30 serve as the bottoms of powder pressing cavities 12. A composite pressing mandrel 36 is inserted through the opening of annular punch 30, a powder tight seal being formed therebetween. As best seen at FIG. 3, the composite pressing mandrel is made up of a solid, magnetically permeable core portion 38 that is slidably retained within a relatively thin, wear resistant, nonmagnetic sleeve 40. The mandrel has two opposing slots to its peripheral surface which form die cavities 12. The unslotted peripheral portions or ears 42 fit tightly against sheath 26.

A magnet preform is made by applying an axially directed pressure on the RE-TM metal powder in die cavities 12 formed between mandrel 36 and casing 26.

The amount of powder required depends on the desired end sizes of magnets. The magnetizing units 16 are activated and upper punch 44 is stroked downwards, compacting the powder in an axial direction with respect to the magnet curvature. The applied magnetic field causes the RE-TM powder particles to rotate during pressing so that the crystallographic C-axis of each lines itself up with the magnetic field flux line 24 at that location. The crystallographic C-axis is in the direction of the preferred crystal orientation in a magnetic field and may also be referred to herein as the "easy" axis. The high magnetic permeability and low reluctance of the mandrel core provide a clear path for the magnetic flux and assure that there is sufficient field flux density in the die cavity to align the particles. At a powder compaction density of about 50% of the density of the rare earth-transition metal composition, the particles become mechanically interlocked with each other so that they can be further compacted and densified without an applied magnetic field and without disrupting their magnetic orientations. At this density the magnetic field is removed and core 38 of composite mandrel 36 is slid out of sleeve 40 in the axial direction. The nonferromagnetic sleeve portion 40 maintains the particles in their compacted and aligned states without being disrupted by removal of mandrel core 38.

The nonmagnetic mandrel sleeve 40 is then withdrawn from pressing fixture 10 in an axial direction. Removal of the nonmagnetic sleeve has substantially no effect on the powder particles. After ferromagnetic core 38 is removed from mandrel 36, the magnetically aligned and mechanically interlocked powder particles are attracted to each other and, as a body, to the steel casing member 26. The casing with the magnetically attached magnet preforms can be axially ejected from press 10 or, alternatively, the die blocks can be designed to separate to remove the casing-magnet preform assembly.

Thus, two magnetized, cohesive, powder masses are formed adjacent to the inside perimeter of a tubular metal casing. These magnet preforms are protected from disruption during movement or further processing by the casing.

In accordance with our method, two motor casings with integral, densified RE-TM magnet pole pieces were formed. In one, the RE-TM powder was $SmCo_5$ and in the other a cerium-free mischmetal alloy having the nominal composition of 0.8 parts mischmetal, 0.2 parts samarium, and 5 parts cobalt. The magnet preforms were formed in a fixture like that shown at FIG. 1. The two diametrically opposed die cavities were about 2 mm wide with an inner radius of about 14 mm and an arc length of about 114° each. Each cavity was long enough to form a 45 mm long magnet preform after powder pressing. The motor casing member was made of a thin sheet of plain carbon ferromagnetic steel. The core of the pressing mandrel was made of a magnetically permeable plain carbon steel, while the mandrel sleeve was made of a nonmagnetic AISI/303 stainless steel alloy.

The powders were poured into the die cavities. The magnetizing coils were then activated to create a 17 kilogauss field at the powder cavities.

Figure 5:
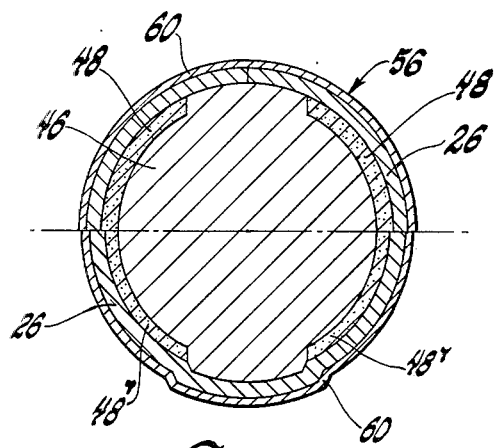
FIG. 5 is a split sectional plan view of the assembly of FIG. 4 along line 5—5 showing the effect of hot isostatic compaction on the lightly compacted RE-TM powder.
Figure 4:
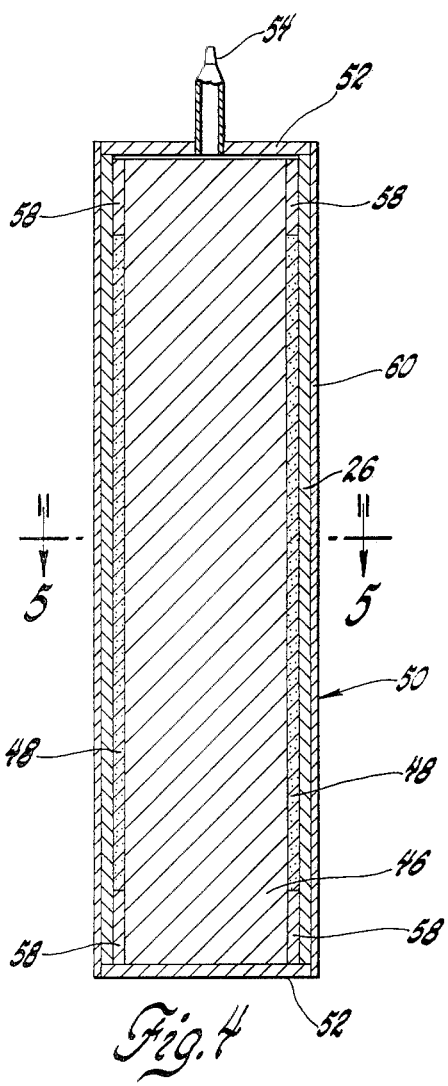
FIG. 4 is a sectional side view of an assembly for densifying the subject RE-TM powder magnet preforms by hot isostatic compaction.

The powders were then pressed in the magnetic field at a pressure of 34 MPa (5100 psi) to a pack density of 58% of the RE-TM composition density. The magnetic core portion of the pressing mandrel was then removed and thereafter the nonmagnetic sleeve portion was withdrawn. While still in the press, a mandrel (46 at FIG. 4) having substantially the same shape as the pressing mandrel was reinserted in the fixture preparatory to densifying the powder preforms by hot isostatic pressing (HIP). This mandrel 46 was made of an austenitic stainless steel (AISI 303) coated with a thin layer of boron nitride to prevent it from sintering to the RE-TM powder in the hot pressing step. As seen at FIG. 4, the assembly of sleeve 26, magnet preforms 48, and HIP mandrel 46 was removed from the press and inserted into a tightly fitting tubular steel container 50 with vertical walls 60 and caps 52 on either end. Removable stainless steel spacers 58 were provided above and below the powder preforms to prevent shrinkage of the sleeve and container thereat. The container was evacuated to a pressure of about $10^{-3}$ mm mercury and sealed at 54. It was placed in an autoclave preheated to 1050° C. After 12 minutes, the furnace was sealed, pressurized to 6.9 MPa (approximately 1035 psi) and held at temperature and pressure for 15 minutes. The heating unit was turned off and the furnace allowed to cool to 850° C. at which temperature it was depressurized. The container 50 was then removed. The upper portion of FIG. 5 shows a cross section of the container assembly before hot isostatic compaction, and the lower portion the same container after HIP. It is readily seen from the Figure that the densification of the RE-TM magnet powders in the pressurized sintering step occurs essentially by radially inward displacement of powder preforms 48, sleeve 26, and sintering vessel 50 against mandrel 46. Sleeve 26 and container walls 60 bond together to form motor casing 56. The thermal expansion coefficient of the steel backed magnets is about $11.7 \times 10^{-6}$ per °C. while that of the stainless steel mandrel is about $16 \times 10^{-6}$ per °C. Thus, upon cooling, mandrel 46 shrinks more than the casing 56 and sintered magnets 48' so it can be easily extracted. The sintering step forms a metallurgical bond between the iron of the casing and the cobalt of the RE-TM powder at the interface creating an interdiffusion zone of approximately 0.05 mm. Electron microprobe analysis of the post-HIP interface showed substantially no diffusion of the rare earth constituent into the steel backing. Microprobe and optical examination of the magnet surfaces showed them to be crack-free.

Figure 6:
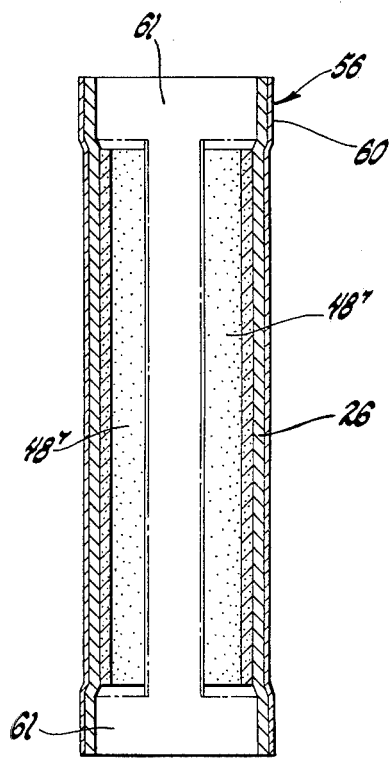
FIG. 6 is a cross-sectional side view of a motor casing containing two arcuate shaped, wafer-thin, RE-TM magnets densified by hot isostatic compaction.

The density of magnets formed in this manner was nearly 100%. After heating the backed magnets for one hour at 1090° C. in argon, to improve their magnetic characteristic, the alignment of the magnet domains was measured at 97% by X-ray crystallographic analysis where a perfect radial magnetic alignment of the domains would be 100%. The caps 52 of the sintering containers were removed to form two layer motor casing 56 with integral magnets 48' of the type shown at FIG. 6. The top and bottom portions 61 of the motor casing 56 are adapted to receive bushings for the motor armature. Motor casing 56 serves as a return flux path for magnets 48' during motor operation.

Figure 7:
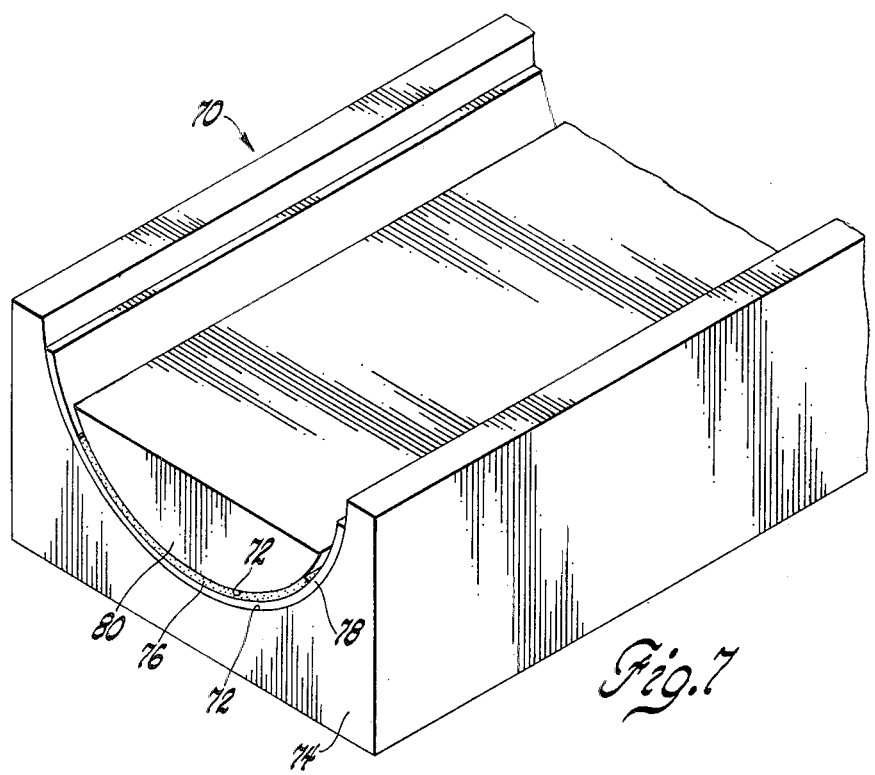
FIG. 7 is a perspective view of a densified RE-TM magnet adjacent a ferromagnetic backing in a set of restrained sintering dies.

Two more magnet preforms were made as above with the tubular steel sleeve member being made up of two semicircular sections positioned in the pressing-magnetizing fixture so that the powder cavities were positioned centrally on each. After pressing to a density of about 50% and radially magnetically aligning the powder, the semicylindrical steel portions with magnetically attached powder masses were removed from the press and positioned in constrained sintering die shown at 70, FIG. 7. The magnet preforms were densified substantially in accordance with the procedure set forth in U.S. Pat. No. 4,144,060, with the exception that the curved die surfaces 72 were machined to fit the curvature of the post-sinter densified magnet 76 and steel backing 78. Briefly, the lightly compacted magnet preform (not shown) and steel backing 78 were positioned in the lower die 74 having the concave working surface. Before sintering, the backing 78 rested in die 74 along a line at either edge of the curved die surface. The top die 80 with the convex working surface was placed on top of the magnetic powder preform. Both the top and bottom dies were made of alloys that could undergo thermal cycling, such as molybdenumTZM alloys, and were coated with boron nitride before sintering to prevent adhesion between the dies and the magnet or steel backing. The upper convex die 80 exerted a pressure of about 3 kPa over the surface of the magnet. The assembly was placed in a sintering furnace having an inert argon atmosphere maintained at a temperature of about 1115° C. for about thirty minutes. The steel backing 78 became plastic so that it conformed to the lower die surface as shown at FIG. 7. The force of the convex die on the powder during sintering compacted the aligned RE-TM powder mass to 96% density. The metallurgical bond formed between the densified magnet and backing was considerably weaker than that created by hot isostatic compaction. These densified steel backed magnets could be inserted into a suitable DC motor casing or two such semicylindrical segments could be welded together to form a casing.

Figure 8:
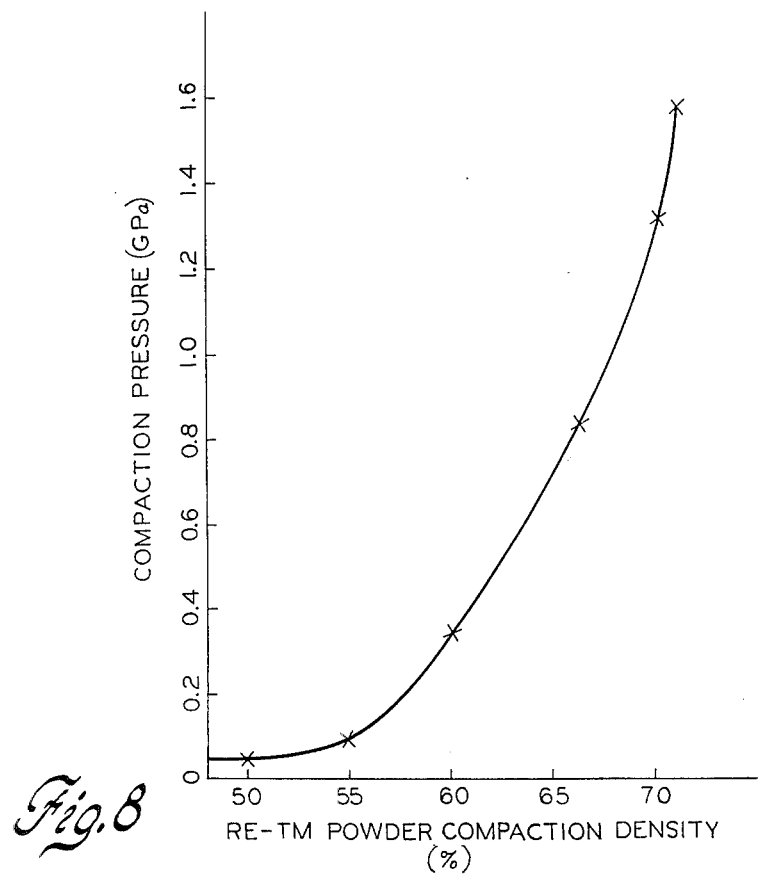
FIG. 8 is a graph of powder compaction pressure versus powder density for pressing $SmCo_5$ powder into a relatively long, thin, arcuate, configuration. Like elements in the several figures are labelled with the same number.

With reference to FIG. 8, it will be appreciated that this invention provides the first known means of simultaneously pressing and magnetizing rare earth-transition powders at relatively low densities in a single fixture to provide a magnet preform that can be processed directly into a radially magnetically aligned permanent magnet.

FIG. 8 is a plot of compaction pressure versus powder pack density for RE-TM magnet preforms 75 mm long by 2 mm thick with a radius of about 14 mm. In accordance with this invention, the RE-TM powder need only be compacted to a density of about 50% whereat the particles are mechanically stablized. As seen from FIG. 8, a powder body with a density of about 55% can be compacted at a relatively low pressure of about 0.1 GPa (15,000 psi). At such pressure, ordinary tooling can be used without danger of excessive tool wear or damage and magnetizing fixtures can serve as die blocks without risk of deforming the die cavities. Prior art methods of sintering RE-TM magnets required a handleable green compact with a pack density of about 65% or higher. FIG. 8 shows that compaction pressure rises sharply to achieve powder densities above about 55%. We have found that at the pressures needed to form self-supporting green compacts specially adapted presses and tooling must be provided to prevent damage to the compacting equipment. Our method avoids the use of such high pressure equipment, decreasing the expense of making the magnets while increasing process reliability and efficiency. These advantages are particularly provided by the use of the composite pressing mandrel in the pressing-magnetizing fixture.

While our invention has been described in terms of specific embodiments thereof, other forms may readily be adapted by those skilled in the art. Thus, our invention is limited only by the following claims.

The embodiments of the invention in which an exclusive property or privilege is claimed are defined as follows:

1. A method of forming rare earth-transition metal powder into a thin, curved, permanent magnet metallurgically bonded to a ferromagnetic backing, the method comprising:
    inserting into a tubular ferromagnetic sheath member a cylindrical composite mandrel having a highly magnetically permeable ferromagnetic core that is slidably retained within a non-magnetic sleeve sized to closely fit against the inner surface of the tubular sheath, said mandrel having at least one axial slot in its peripheral surface which in combination with the inner wall of the tubular sheath forms a cavity in the magnet shape;
    filling said cavity with rare earth-transition metal powder in which the powder particles have single magnetic domains;
    applying a magnetic field to align the easy axis of the powder particles radially with respect to the cavity curvature, the magnetically permeable mandrel core providing a low reluctance path for the field flux and a high flux density in the powder cavity;
    pressing the powder in the axial direction to a density of at least about 50% of the rare earth-transition metal density to fix the powder particles in the magnetically aligned state,
    removing the magnetic field, the particles thereafter having sufficient residual magnetism to adhere to adjacent ferromagnetic material;
    withdrawing the ferromagnetic core portion from the mandrel, and thereafter withdrawing the non-magnetic sleeve portion without disturbing the particle alignment such that said the rare earth-transition metal powder is retained against the sheath in a cohesive mass in the shape of the magnet by residual magnetic attraction; and
    heating the powder mass to promote densification to at least about 90% of the density of the rare earth-transition metal.

2. A method of forming rare earth-transition metal powder directly into a thin, curved, precision shaped permanent magnet bonded to a ferromagnetic layer wherein the magnetic domains of said magnet are predominantly radially aligned with respect to the magnet curvature, the method comprising:
    forming at least one curved cavity substantially in the shape of the magnet between a tubular ferromagnetic sheath member having a working surface shaped to define the outer curved surface of the magnet and a composite forming mandrel having a working surface shaped to define the inner curved surface of the magnet, the mandrel having a ferromagnetic core slidably retained in a non-magnetic sleeve;
    introducing rare earth-transition metal powder into the cavity in which the powder particles have single magnetic domains;
    pressing the powder in the direction of the axis of the magnet to a density of at least about 50% of the rare earth-transition metal density whereat the powder particles become mechanically interlocked with each other;
    subjecting the powder in the cavity to a magnetic field before said particles become mechanically interlocked such that the magnetic domains of the powder particles are radially magnetically aligned with respect to the magnet curvature and such that the powder particles have residual magnetism after the field is removed;

removing the magnetic field;

withdrawing the magnetic core from the mandrel, the mandrel sleeve preventing disturbance of the magnetically aligned powder and thereafter withdrawing the mandrel sleeve such that the powder particles remain magnetically attached to the tubular sheath in a cohesive mass in the magnet shape, and heating the powder mass to promote densification to at least about 90% of rare earth-transition metal density and to bond the magnet to the sheath.

3. A method of forming rare earth-transition metal powder into a thin, curved permanent pole magnet for an electrical motor, wherein said magnet is metalurgically bonded to a ferromagnetic sheath member that serves as a backing for said magnet and as a flux path for the motor, the method comprising:

inserting into a tubular steel sheath member a composite mandrel having a cylindrical ferromagnetic core slidably retained within a thin, non-magnetic sleeve, said mandrel having at least one axial slot in its peripheral surface which in combination with the inner wall of the sheath forms a thin curved cavity in the shape of the magnet;

filling the cavity with rare earth-transition metal powder in which the powder particles have single magnetic domains;

applying a magnetic field to the powder to align the easy axes of the particles radially with respect to the magnet, the mandrel core providing a low reluctance path for the field flux and a high flux density in the cavity, pressing the aligned powder in the direction of the magnet axis to compact the powder mass to a density of at least about 50% of the density of the rare earth-transition metal and to fix the original powder particles in their magnetically aligned positions, the particles having sufficient residual magnetism to adhere to said casing upon removal of said field, removing the applied magnetic field, withdrawing the ferromagnetic core portion from the mandrel, and thereafter withdrawing the non-magnetic sleeve portion such that said the rare earth-transition metal powder particles are magnetically maintained in a cohesive mass against the sheath in the configuration of the magnet; and heating the powder mass at a pressure greater than atmospheric pressure to promote the particles to coalesce to a density of at least about 90% of their theoretical density and to metallurgically bond the magnet to the sheath.

* * * * *